United States Patent [19]

Galli

[11] Patent Number: 4,699,816

[45] Date of Patent: Oct. 13, 1987

[54] ADHESIVE TAPES

[75] Inventor: Graziano Galli, Formia Latina, Italy

[73] Assignee: Manuli Autoadesivi S.p.A., Cologno, Italy

[21] Appl. No.: 809,919

[22] Filed: Dec. 17, 1985

[30] Foreign Application Priority Data

Dec. 31, 1984 [IT] Italy ................. 24293 A/84

[51] Int. Cl.⁴ .............................................. A61F 13/02
[52] U.S. Cl. ...................................... 428/40; 428/345; 428/352; 428/353; 428/906; 428/500; 156/244.11
[58] Field of Search ................. 428/40, 352, 353, 345, 428/354, 906; 156/244.11

[56] References Cited

U.S. PATENT DOCUMENTS

| | | | |
|---|---|---|---|
| 4,001,167 | 1/1977 | Tungseth et al. | 428/40 |
| 4,421,817 | 12/1983 | Pina et al. | 428/207 |
| 4,500,021 | 2/1985 | Bildusas | 428/40 |
| 4,513,059 | 4/1985 | Dabroski | 428/40 |

Primary Examiner—Edith Buffalow
Attorney, Agent, or Firm—Murray and Whisenhunt

[57] ABSTRACT

In making pressure sensitive tapes having an olefinic polymer or copolymer support, in particular polypropylene, or a support of coextruded film of an olefinic polymer and of another polymer or copolymer, modification of the adhesive by addition of a mineral or synthetic oil brings about a substantial reduction of noise upon unwinding the tape. Said modification can be combined with modification of the release coat provided on the back of the tape and/or with special treatment of the support back.

26 Claims, No Drawings

ADHESIVE TAPES

The present invention relates to pressure sensitive tapes having a support of olefinic polymer or copolymer, in particular polypropylene, or of coextruded film of olefinic polymer or copolymer and of another polymer or copolymer, having low noise upon unfolding or unrolling. Pressure sensitive tapes with polypropylene or other olefinic polymer or copolymer (mono- or bi-oriented, with balanced stretch, coextruded, etc.), supports obtained with: (1) elastomer or plastomer adhesive systems applied with (a) conventional systems from solutions in organic solvents, (b) systems from aqueous dispersion, (c) melting systems, better known as "hot melt", or (d) reactive systems, etc. (2) optional priming systems if considered necessary; and (3) antiadhesive systems applied on the side opposite the side on which the adhesive is applied, generally with a polyvinylcarbamate, polyvinylbehenate, etc. base; unwind, especially if the unrolling operation is performed at high speed as in the operation of cutting the spools for preparation of rolls or of application of the tape with automatic or semiautomatic machines or even manually, with high noise levels and the ensuing problems or environmental pollution and disturbance for personnel.

It is not clear why the noise level of tapes having a polypropylene or other olefinic polymer support is higher under equal working conditions than that of tapes having other types of support.

It is thought that said noise level may be linked (a) with the organoleptic characteristics of the support such as for example thickness, rigidity, surface condition (smooth, glossy, rough), and others; (b) with characteristics dependent on the surface energies of the support such as for example structure, free surface energies, critical surface tensions, static friction coefficients; or (c) with characteristics dependent upon the adhesivization system such as for example adhesive value of the tape, adhesive value on the support, unrolling force, nature and composition of the adhesive, and nature and composition of the antiadhesive coat.

Cost considerations lead to the employment of ever thinner films but it is possible to modify the rigidity thereof by the use of copolymers in blocks or in a random arrangement, preferably ethylene-propylene copolymers, and also modify the surface condition of the films by the introduction of coextruded and/or coupled films.

The structure and chemical nature of the polymer which makes up the film have an undoubted effect on the static friction coefficient and critical surface tension.

Indicative examples from the literature are set forth in the following table.

TABLE 1

| Polymer | Static friction coefficient | critical surface tension (dyne/cm) |
|---|---|---|
| polyvinylidene chloride | 0.90 | 40 |
| polyvinylchloride | 0.50 | 39 |
| polypropylene | 0.34 | 29 |
| polyethylene | 0.33 | 31 |
| polyvinyl fluoride | 0.30 | 25 |
| polytrifluoroethylene | 0.30 | 22 |
| polytetrafluoroethylene | 0.04 | 18 |

The applicant has already noted in the past (Italian patent application No. 21842 A/82 filed on June 11, 1982) that in the case of olefinic polymer or copolymer supports, principally of polypropylene, treatment of the support surface designed to form the back of the tape i.e. the surface opposite the adhesive surface in such a manner as to bring the surface tension to higher values and specifically higher than 33 dyne/cm brings about a large noise reduction.

Alternatively, as described in Italian Patent filed on Sept. 7, 1982 the applicant described a modification of the release coat which calls for the employment for said coat of fluorinated compounds, reactive silicone compounds, silicone compounds modified with polyamidic resins, halogenated polyolefinic resins, and others.

The high noise level of adhesive tape with a polyolefinic support penalizes its use in many applications despite the fact that such supports are known to be more economical than the types of polymers employed heretofore in the manufacture of pressure sensitive tapes.

It has now been found and comprises the object of the present invention that modification of the adhesive optionally in combination with that provided by the previous art as to the nature of the support and/or as to the treatment of the back of the tape and/or as to the composition of the release coat, brings about a substantial reduction of tape noise upon unrolling by keeping the characteristics of the pressure sensitive tape thus produced basically unchanged and satisfactory and holding production thereof at industrially acceptable costs.

The present invention therefore provides the improvement in a pressure sensitive tape having a polyolefinic film support in particular polypropylene optionally coextruded with other polymers and copolymers, said support being covered on the back with a release coat and on the adhesive side with an optional priming coat and with a coat of adhesive consisting of the fact that said adhesive of conventional composition, i.e. elastomer and/or plastomer, has added mineral oil, i.e. aromatic, naphthenic or paraffinic, or synthetic oil such as alkyl-benzene oil.

As already mentioned the modified adhesive in accordance with the present invention may be combined with the modifications in the release system and the surface treatment of the back of the support described in the Italian patent application mentioned above and to which reference should be made for further details.

The pressure sensitive tape support in accordance with the invention calls for the use of olefinic polymer or copolymer films, in particular polypropylene and/or $C_2$-$C_3$ block copolymers; films coextruded and/or combined in two or more layers of (a) polypropylene and $C_3$-$C_2$ random copolymers, (b) polypropylene and type $C_4$ polymers, i.e. polybutene and/or copolymers of the $C_3$-$C_4$ type; or (c) polypropylene and polymers or copolymers such as polycarbonate (PC), ethylene-vinylacetate (EVA), ethylene-vinyl alcohol (EVAL), ethylene-ethylacrylate (EEA), ethylene acrylic acid (EAA) and others.

The priming coat is of the conventional type, optionally combined with the surface treatment with flame, with corona effect and similar, while for the adhesive the use of conventional adhesives with an elastomer or plastomer base with added aromatic, naphthenic or paraffinic mineral oil or synthetic oil of the alkyl-benzene type in a quantity of 0.5–30% by weight of the total mixture, preferably in quantities of 5–15% by weight and still more preferably in quantities of 10% by weight, is called for. Among the mineral oils called for by the invention can be mentioned for example vaseline oil (Carlo Erba Fu), Shell Flex 451 (Shell), Flexon 876 (Esso), Industrial 105 (Lubra), Basaron 105 (Lubra); BP 22 N (BP) and ECA 6482 (Esso). Among the synthetic oils the alkyl benzenes in which the alkyl chain contains from 12 to 24 atoms of carbon, optionally in the form of mixtures, are preferred.

The adhesive is applied to the support over the priming coat if any with one of the known conventional systems, e.g. from organic solvent solutions, aqueous dispersion systems, hot melt systems, reactive systems, etc.

The present invention has been subjected to experimental tests performed on samples prepared in the following manner:

Film, primer application, optional back treatment, release application adhesive application.

The films used were obtained by extrusion or coextrusion on flat-head installations with longitudinal stretching and subsequent transversal stretching. The adhesive employed was of elastomer type and was obtained by dissolving natural and synthetic rubbers with added hydrocarbon resins and colophon derivatives. The modifications of the adhesive described in the examples were obtained by adding naphthenic and/or alkylbenzene oils available in trade.

The adhesive was applied froma 30% dry substance solution in hydrocarbons so as to provide a 25 g/square meter of dry adhesive coat.

Evaluation of the noise index was performed by direct comparison while unrolling the tapes at a speed of 10 meters per minute and measuring the noise level in decibel.

The present invention was subjected to experimental tests. The results of the tests are given in the annexed table wherein (1) examples 1–2 concern samples of pressure sensitive tape in which the support is of polypropylene and the adhesive is conventional (example 1) or modified in accordance with the invention (example 2); (2) examples 3–9 concern samples in which the adhesive was modified in accordance with the present invention in combination with the modification of the support; and (3) samples 10–17 concern samples in which the adhesive modified in accordance with the present invention is combined with a release coat in conformance with the invention described and claimed in Italian Patent application No. 23156 A/8 indicated above and (except for examples 10 and 14) with modification of the support.

In the table the initials shown have the following meanings. BOPP: bioriented polypropylene; Bo coex $C_2/C_3$-PP: bioriented coextruded polypropylene and $C_2/C_3$ copolymer film; BO coex $C_4$ PP: bioriented coextruded polypropylene and polybutene film; and BO coex EVAL PP: bioriented coextruded polypropylene and copolymer ethylene vinyl alcohol film.

The primer or fixing coat of the adhesive is the conventional type with an elastomer base while the release coat in examples 1–9 has a polyvinyl carbamate base (PB Carb), and in examples 10–17 it is based on a silicone adduct (React sil) obtained by adduction reaction of a reactive silicone (containing type NH or OH reactive groups) with isocyanates (NCO groups). The adhesive is a conventional elastomer adhesive in example 1 while is the same adhesive with the addition of 10% by weight of a naphthenic oil for examples 2–5 and 10–13 and 10% of an alkyl-benzene with an alkylchain containing 12–24 atoms of carbon in the remaining examples.

The table shows clearly the considerable lowering of unrolling noise obtained with the present invention and in particular by combing modification of the adhesive with the modification of the release coat and with the modification of the support.

Similar results are obtained by combing modification of the adhesive with treatment of the back of the support, the latter being optionally combined with modification of the release coat and of the support.

It is also worth noting that the pressure sensitive tape obtained with the present invention, i.e. with modification of the adhesive and with a release coat modified in accordance with the Italian patent application mentioned above by using a support of bioriented polypropylene, is perfectly printable under the conditions called for in U.S. Pat. No. 4,421,817 dated Dec. 20, 1983 and French Patent application 8402750 filed Feb. 23, 1984.

| EXAMPLE No. | 1 | 2 | 3 |
|---|---|---|---|
| Support | BOPP | BOPP | BO coex $C_2/C_3$ PP |
| Thickness | 30 | 30 | 30 |
| RC | PV carb | PV carb | PV carb |
| Primer | elastomer | elastomer | elastomer |
| Adhesive | normal elastomer | elastomer and naphth. oil | elastomer and naphth. oil |
| Noise index | 100 | 80 | 60 |

| EXAMPLE No. | 4 | 5 | 6 |
|---|---|---|---|
| Support | BO coex $C_4$PP | BO coex EVAL PP | BO PP |
| Thickness | 30 | 30 | 30 |
| RC | PV carb | Pv carb | PV carb |
| Primer | elastomer | elastomer | elastomer |
| Adhesive | elastomer and naphth. oil | elastomer and naphth. oil | elastomer alkyl benzene oil |
| Noise index | 60 | 50 | 60 |

| EXAMPLE No. | 7 | 8 | 9 |
|---|---|---|---|
| Support | BOcoex $C_2/C_3$PP | BO coex $C_4$PP | BO coex EVAL PP |
| Thickness | 30 | 30 | 30 |
| RC | PV carb | PV carb | PV carb |
| Primer | elastomer | elastomer | elastomer |
| Adhesive | elastomer alkyl benz. oil | elastomer alkyl benz. oil | elastomer alkyl benz. oil |
| Noise index | 70 | 60 | 70 |

| EXAMPLE No. | 10 | 11 | 12 |
|---|---|---|---|
| Support | BOPP | BO coex $C_2/C_3$PP | BO coex $C_4$PP |
| Thickness | 30 | 30 | 30 |
| RC | react. sil. | react. sil | react. sil. |
| Primer | elastomer | elastomer | elastomer |
| Adhesive | elastomer naph. oil | elastomer naph. oil | elastomer naph. oil |
| Noise index | 40 | 30 | 20 |

| EXAMPLE No. | 13 | 14 | 15 |
|---|---|---|---|
| Support | BO coex EVAL PP | BOPP | BO coex $C_2/C_3$PP |
| Thickness | 30 | 30 | 30 |
| RC | react. sil. | react. sil. | react sil. |
| Primer | elastomer | elastomer | elastomer |
| Adhesive | elastomer naph. oil | elastomer benz. alkyl oil | elastomer benz. alkyl oil |
| Noise index | 30 | 30 | 40 |

-continued

| EXAMPLE No. | 16 | 17 |
| --- | --- | --- |
| Support | BO coex C₄PP | BO coex EVAL PP |
| Thickness | 30 | 30 |
| RC | react. sil. | react. sil. |
| Primer | elastomer | elastomer |
| Adhesive | elastomer benz. alkyl oil | elastomer benz. alkyl oil |
| Noise index | 40 | 30 |

I claim:

1. A method of reducing noise generated upon unwinding a pressure sensitive tape comprising an olefinic polymer or copolymer support, said support having an adhesive side and a back side, said adhesive side having an adhesive coat formed of an adhesive of a conventional elastomer or plastomer, said back side having at least one release coat, said method comprising the step of incorporating into said adhesive coat 0.5 to 30% by weight of a mineral oil or an alkylbenzene synthetic oil.

2. A method according to claim 1, wherein said tape comprises an olefinic polymer or copolymer support coextruded or combined with another polymer or copolymer.

3. A method according to claim 1, wherein said adhesive side has a priming coat.

4. A method according to claim 1, wherein the amount of oil incorporated into said adhesive coat is 5 to 15% by weight.

5. A method according to claim 1, wherein the amount of oil incorporated into said adhesive coat is about 10% by weight.

6. A method according to claim 1, wherein said oil is a mineral oil of an aromatic, naphthenic or paraffinic type.

7. A method according to claim 1, wherein said oil is an alkylbenzene oil, in which the alkyl group contains 12-24 carbon atoms.

8. A method according to claim 1, wherein said support is a polypropylene film.

9. A method according to claim 1, wherein said support is a polypropylene film coextruded or combined with material selected from the group consisting of a $C_2/C_3$ copolymer in random arangement, a type -$C_4$ polymer and/or a $C_3/C_4$ copolymer, and a polymer such as polycarbonate or a copolymer such as ethylene-vinylacetate, ethylene-vinyl alcohol, ethylene-ethylacrylate, or ethylene-acrylic acid.

10. A method according to claim 1, wherein said release coat consists of a fluorinated compound.

11. A method according to claim 1, wherein said release coat consists of an adduct obtained by reaction of a silicone compound having reactive terminal groups with an isocyanate.

12. A method according to claim 11, wherein said silicone compound is modified with polyamide, polyolefin or halogenated resins.

13. A method according to claim 1, wherein said back side is treated to bring its critical surface tension above 33 dyne/cm.

14. A method according to claim 13, wherein said treatment is with flame or with corona effect.

15. A pressure sensitive tape exhibiting reduced noise when unwound, said pressure sensitive tape comprising an olefinic polymer or copolymer support, said support having an adhesive side and a back side, said adhesive side having an adhesive coat and said back side having at least one release coat, said adhesive coat being formed of an adhesive of a conventional elastome or plastomer, said adhesive coat comprising a noise-reducing amount of 5 to 15% by weight of a mineral oil or alkylbenzene synthetic oil.

16. A pressure senstive tape according to claim 15, wherein said tape comprises an olefinic polymer or copolymer support coextruded or combined with another polymer or copolymer.

17. A pressure sensitive tape according to claim 15, wherein said adhesive side has a priming coat.

18. A pressure sensitive tape according to claim 15, wherein said oil is present in an amount of about 10% by weight.

19. A pressure sensitive tape according to claim 15, wherein said oil is a mineral oil of an aromatic, naphthenic or paraffinic type.

20. A pressure sensitive tape according to claim 15, wherein said oil is an alkylbenzene oil, in which the alkyl group contains 12-24 carbon atoms.

21. A pressure sensitive tape according to claim 15, wherein said support is a polypropylene film.

22. A pressure sensitive tape according to claim 15, wherein said support is a polypropylene film coextruded and/or combined with a material selected from the group consisting of a $C_2/C_3$ copolymer in random arrangement, a type -$C_4$ polymer and/or a $C_3/C_4$ copolymer, and a polymer such as polycarbonate or a copolymer such as ethylene-vinylacetate, ethylene-vinyl alcohol, ethylene-ethylacrylate, or ethylene-acrylic acid.

23. A pressure sensitive tape according to claim 15, wherein said release coat consists of an adduct obtained by reaction of a silicone compound having reactive terminal groups with an isocyanate.

24. A pressure sensitive tape according to claim 15, wherein said silicone compound is modified with polyamide, polyolefin or halogenated resins.

25. A pressure sensitive tape according to claim 15, wherein said back side is treated to bring its critical surface tension above 33 dyne/cm.

26. A pressure sensitive tape according to claim 15, wherein said treatment is with flame or with corona effect.

* * * * *